United States Patent
Warner

[11] Patent Number: 5,853,452
[45] Date of Patent: Dec. 29, 1998

[54] SYNTHETIC RUTILE PRODUCTION

[75] Inventor: Noel A. Warner, Birmingham, United Kingdom

[73] Assignee: The University of Birmingham, United Kingdom

[21] Appl. No.: 338,639
[22] PCT Filed: May 21, 1993
[86] PCT No.: PCT/GB93/01054
   § 371 Date: Feb. 19, 1997
   § 102(e) Date: Feb. 19, 1997
[87] PCT Pub. No.: WO93/24668
   PCT Pub. Date: Dec. 9, 1993

[30] Foreign Application Priority Data

May 23, 1992 [GB] United Kingdom .................. 9211052

[51] Int. Cl.⁶ ............................ C22B 34/12; C21B 13/00
[52] U.S. Cl. ................................ 75/435; 75/957; 423/610
[58] Field of Search ........................ 75/435, 957; 423/610

[56] References Cited

U.S. PATENT DOCUMENTS 3,326,671  6/1967  Warner ..................................... 75/957
4,701,217  10/1987  Warner ..................................... 75/500

OTHER PUBLICATIONS

Patent Abstracts of Japan JP58049622, Mar. 23, 1983.

Primary Examiner—Melvyn Andrews
Attorney, Agent, or Firm—Andrus, Sceales, Starke & Sawall

[57] ABSTRACT

Hot metal is circulated by an R-H unit in a closed loop path through first and second hearths and chambers. Titaniferous material containing iron oxide is introduced into the first hearth and the iron oxide therein is reduced in a heating zone in the first hearth to iron to produce titania slag having a reduced iron content which is removed in chamber before the hot metal passes via an underflow weir into chamber at which coal is added and a proportion of hot metal is removed. The addition of coal is such that more than 2% by weight of carbon dissolves in the hot metal in the second hearth. Coal ash slag is removed at chamber, while the hot metal containing the dissolved carbon is recirculated to the first hearth.

9 Claims, 1 Drawing Sheet

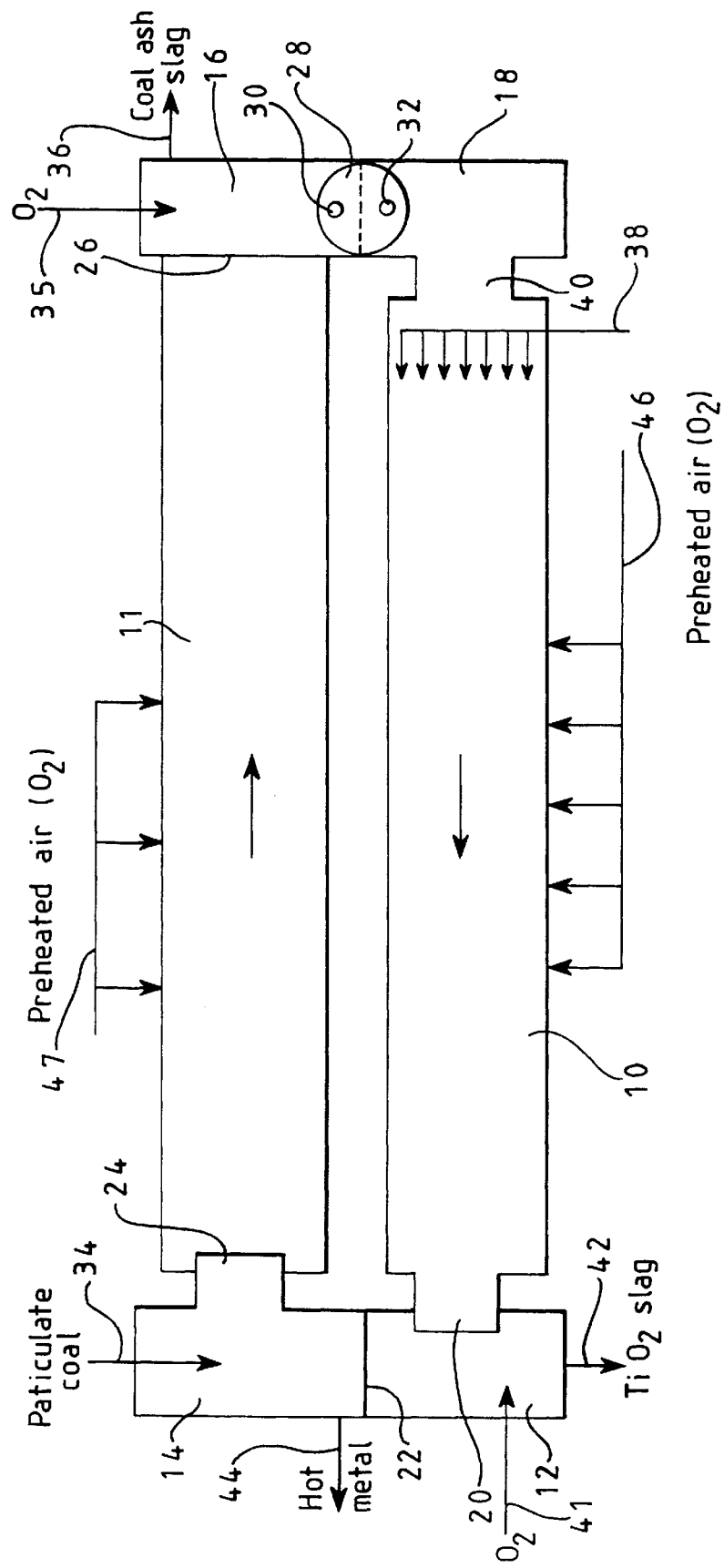

SYNTHETIC RUTILE PRODUCTION

This invention relates to the production of synthetic rutile of a quality suitable for use as a feedstock in the production of $TiO_2$ pigment via the chloride route.

The chloride route to $TiO_2$ pigment production has become increasingly important in view of environmental concerns about the acid wastes produced by the sulphate $TiO_2$ process which can accept lower grade titaniferous ores.

Commercial synthetic rutile production for use as a feedstock in the chloride route is normally based on ilmenite feedstock containing 54 to 60% $TiO_2$, with a distinct preference for material of at least 58% $TiO_2$ content.

Various proposals have previously been made for processing lower grade titaniferous materials as alternative sources of $TiO_2$ pigment. For example, a process has been used which involves blending ilmenite with coke and smelting in an electric arc furnace to separate most of the iron as saleable pig iron and to form a titania-enriched slag.

Enrichment of the $TiO_2$ content of conventional titanium slags has also been disclosed by dc arc smelting.

EP-A-0266975 (corresponding to U.S. Pat. No. 4,701,217) discloses a method of smelting metal oxide material comprising forcibly circulating a molten carrier material in a closed loop path serially through a smelting reduction zone, a slag separation zone and a heating zone; contacting the metal oxide material with the molten carrier material; introducing a carbonaceous reductant to the molten carrier material; at least partially reducing the metal oxide to metal by the carbonaceous reductant in the smelting reduction zone, the metal oxide and carbonaceous reductant being utilised in proportions such that the carbon from the carbonaceous reductant is converted to carbon monoxide; reacting the carbon monoxide with oxygen in the heating zone at the surface of the molten carrier material so that the heat generated by the reaction is transferred to the molten carrier material which is circulated to the smelting reduction zone; separating slag from said molten carrier material in said slag separation zone before the molten carrier material is circulated to the heating zone so that the surface of the molten carrier material which is circulated to the heating zone is substantially free of slag; and recovering said metal. Amongst a large number of possible feedstocks which are described, EP-A-0266975 discloses the application of the above process to ilmenite to form titaniferous slag (a source of synthetic rutile) and pig iron, but there is no detailed example of this and no proposals as to how to upgrade the quality of the titaniferous slag to the quality required for $TiO_2$ pigment production via the chloride route.

According to the present invention, there is provided a method of upgrading titaniferous material containing iron oxide, comprising contacting the titaniferous material with molten iron containing dissolved carbon so as to reduce at least some of the iron oxide in the material to iron and produce a titania slag having a lower iron oxide content.

Most preferably the method of upgrading titaniferous material containing iron oxide, comprises the steps of circulating a molten carrier material comprising molten iron and dissolved carbon in a closed loop path through first and second hearths; introducing the titaniferous material into the carrier material in a heating zone in the first hearth so as to reduce iron oxide to iron and produce a titania slag having a lower iron content; removing the titania slag from the molten carrier material before the latter is circulated to the second hearth; introducing carbonaceous reductant into the molten carrier material so as to cause carbon to dissolve in the carrier material in the second hearth; and performing a further slag removal operation on the circulating molten carrier material before passing the latter to the first hearth.

In the above described method, the further slag removal operation effected in the second hearth after introduction of the carbonaceous reductant serves to remove slag resulting from addition of the carbonaceous reductant so that such slag does not become mixed with the high grade titanium dioxide slag which has formed in the first hearth. Thus, it is possible to use a relatively low grade carbonaceous reductant such as ordinary coal rather than having to use an expensive very low ash coal. Because the coal ash slag is kept separate from the high grade titanium dioxide slag, if necessary, flux materials such as limestone or dolomite can be blended with the added coal to permit utilisation of coal with associated ash having a relatively high ash fusion temperature without introducing highly undesirable calcium or magnesium oxides into the titania slag product. This feature is particularly significant if the circulating molten carrier material is to be maintained at temperatures considerably lower than that of the titania slag product as will be mentioned hereinafter, and in such cases it is sometimes necessary to ensure adequate fluidity of the coal ash slag by addition of appropriate fluxing materials in the first hearth.

It is highly preferred to control the amount of carbon in the iron relatively close to carbon saturation, typically so that the carbon is at least 2% and most preferably in the range 3 to 5% by weight. By controlling the carbon at a relatively high level, the kinetics of the smelting reduction reactions are enhanced, which because of their large endothermicity tend to keep the solid charge material below its melting point for as long as possible. It has been observed that reduction reactions of solid pellets of ilmenite proceed most rapidly whilst the charge pellets are solid and floating on the surface of the molten carrier material. For the same reason, it is preferable not to preheat to an elevated temperature the charge material which ideally is pelletised and sintered to form hard strong and dense pellets, typically about 1.5 cm in diameter. Preferably, the pellets are stored cold in preparation to being charged carefully to the first hearth so that they are dispersed uniformly across the width of the molten carrier material and then float away from the charge area so that initially some 55 to about 70 percent of the free surface of molten carrier material is covered with these single charge pellets. Some initial sticking together of freely floating pellets is of no consequence because as reaction proceeds they normally tend to separate from each other and float downstream on the top of the carrier material. After about 100 to 200 seconds retention time, pellet identity is lost and a slag/clinker layer is formed on top of the molten carrier material. At this stage, it is very important to prevent this slag/clinker layer lifting off the surface of the molten carrier material thus precluding further reduction taking place at an acceptably high rate.

Up to this point, no combustion is permitted above the floating charge pellet layer and, indeed, some cooling of roof refractories in this area of the second hearth may be undertaken to delay pellet fusion. Thereafter, however, combustion of smelting reduction gases, principally, carbon monoxide to carbon dioxide, is encouraged to take place so that radiant energy is transmitted to the top of the slag/clinker surface and its temperature is progressively raised as the material floats away on top of the molten carrier material. Some 300 seconds or so retention time in this fired region is typically required to bring the mean slag temperature up to around 1600° or 1650° C., whilst the molten carrier material rises to no more than about 1500° C. having been introduced into this furnace hearth at about 1450° C. initially near where the ilmenite charge pellets are first admitted. This differential in temperature between molten carrier material and the floating slag is in contradistinction to other smelting reduction processes using melt circulation, where the aim is to increase the emissivity of the surface of the molten carrier material without, however, introducing a large temperature drop across a very thin slag layer. In the present case, the circulation rate and the furnace dimensions are preferably designed so that a titania slag layer, typically around 4 mm in thickness, is formed which, with post combustion of CO to $CO_2$ in the freeboard above the melt, gives rise to radiative heat transfer intensities of around 125 kw/$M^2$, yielding temperature differences across the slag layer of about 160° C. Thus the objective of generating high slag temperatures without having to expose the whole melt circulation loop to excessively high temperatures is readily obtained by this mechanism. This factor along with relatively low melt velocities of about 5 cm/s in the first hearth enables a molten lead hearth layer proposed for use in, for example, EP-A-0266975 to be dispensed with. Some localised cooling of the refractory in the immediate area of the slag/liquid metal interface may also be introduced to prevent contamination of the slag product and to minimise refractory attack.

At temperatures below about 1700° C. or so it is to be appreciated that slags containing 90 percent $TiO_2$ or higher are not completely liquid but exist in a two phase region of liquid with a solid phase, which is reported in the literature to be rutile. Such two phase slags, particularly if some $TiO_2$ has been reduced to the lower oxide $Ti_2O_3$, are known to possess very high viscosity, but nonetheless, they can be overflown with the, molten carrier material, into a slag reservoir and accumulated therein whilst the carrier material leaves this region via an underflow weir. Whilst contained in this reservoir the slag may be top-blown with either a single oxygen lance or an array of lances to promote regeneration of $TiO_2$ from $Ti_2O_3$ which releases sufficient heat to fuse the remaining solid rutile phase and provide enough surplus heat to satisfy the energy demands of some localised freeze-cooling at the slag/metal interface in this slag reservoir and to enable localised cooling to generate a protective solid rutile layer on the walls of the reservoir itself. This exothermic heat generated in situ in the slag is made available by purposely providing sufficient residence time in the smelting reduction zone to convert a significant fraction of the $TiO_2$ to $Ti_2O_3$ and, depending on the exact chemical composition and configuration employed, this may be at least one half to two thirds of the $TiO_2$ in the feed concentrate being reduced initially to $Ti_2O_3$. This reduction of $TiO_2$ is accomplished with dissolved carbon in the carrier melt and the dissolution requirements of fixed carbon from the carbonaceous reductant in the second hearth of the melt circuit need to be taken into account in providing adequate carbon dissolution for the primary smelting reduction reactions and this additional service requirement.

During smelting reduction, a multitude of fine metal prills (droplets) are ejected into the slag layer and whilst the slag layer has a high viscosity it is difficult for these prills to settle back into the bulk iron-carbon melt. An important aspect of the operation of this titania slag reservoir is to ensure that high fluidity slag is generated and the opportunity is given for metal prills to settle out before the product slag is intermittently tapped or alternatively continuously overflown into a receiving vessel or ladle. Typically, the slag leaves the reservoir at about 1730° C., whilst the molten carrier material leaves the region normally around 1500° C., it being appreciated that slag/carrier material contact area is minimised in this final part of the melt circuit so that such temperature differences are sustainable by virtue of the relatively high circulation rates of metal in the circuit in terms of the actual metal production rate and the limited slag/metal interfacial area provided when the slag reaches its highest temperature level.

It will be appreciated that ilmenite smelting is more demanding in terms of carbon dissolution than say a normal smelting reduction process for coal-based ironmaking. The necessity for having carbon levels not that far removed from carbon saturation as already discussed puts pressure on the carbon dissolution area of the melt circulation loop. Despite this, it is possible with appropriate modifications, to retain the advantages of using particulate coal (not pulverised) essentially in the as received condition with minimal preparation other than drying to remove free moisture with perhaps some coarse crushing and screening. To this end, dry lump coal and associated fines can be added at one end of the second hearth so that the floating material lose their volatiles and the coal is at least partly carbonised as it floats freely along with iron-carbon carrier material at a velocity in the region of say 20 cm/s. Under free floating conditions, a coal with an ash content of 8 percent could be expected to generate (with flux addition to enhance fluidity if necessary) a coal ash slag layer typically less than 0.02 mm in thickness so that even quite fine coal particles floating with such a layer could be expected to penetrate into the iron-carbon melt throughout most of their existence before liquid slag inhibits carbon dissolution from their last remnants. The "hydraulic gradient" associated with the open-channel flow of the carrier ensures that floating coal ash slag does not accumulate other than at the far end of the second hearth where it is dammed to form a very shallow lake or pool of slag immediately upstream of an underflow weir at the downstream end of the second hearth. Typically this pool of slag is no more than a few millimeters or a centimeter in depth and its influence does not extend upstream significantly into the free flowing region. The purpose of this dam is to constrain the lump carbonised coal so that it forms effectively an almost static layer of coked material in contact with the iron-carbon carrier material which flows virtually unimpeded underneath the downstream weir to be removed continuously e.g, via an upleg of an RH vacuum lift and transported then into the first hearth. The principal mechanism of carbon dissolution under the conditions described is forced convection.

By controlling the rate of removal of the carrier material from under the coked material (e.g, by controlling the flow of inert lift gas into the RH upleg), it is possible to vary the melt flow rate according to a pre-arranged schedule and in so doing, for example, if the flow is stopped momentarily or reduced appreciably, the slag pool upstream of the underflow weir and its associated residual coke particles and some iron-carbon melt will overflow the weir and be collected in a slag reservoir downstream of the weir. The coke particles in this reservoir can be gasified by a single top blow oxygen lance or, if more convenient, an array of such oxygen lances, such that eventually slag overflowing as discharged from this reservoir contains very little residual unburnt coke. The $CO/CO_2$ gases generated pass back up the second hearth to be combusted above the melt along with coal volatiles so that the heat thus generated satisfies not only the coal carbonisation and dissolution requirements, but also is picked up by the carrier iron-carbon melt so that heat is transferred as sensible heat in the melt to satisfy the thermal demands of smelting reduction in the first hearth. The associated iron-carbon melt that also overflows intermittently separates out and then rejoins the principal metal flow via which has passed through the underflow weir.

The total coal requirement for smelting one tonne of high-grade ilmenite concentrate containing 63% $TiO_2$ and 32% ferric oxide to a titaniferous slag with a composition typically of 90% $TiO_2$ and about 5% ferrous oxide along with molten iron containing about 4% carbon is calculated to be around 0.2 tonne of medium volatile coal with the following analysis (dry basis):

| % C | % H | % N | %S | % O | % Ash | % Fixed C | % Volatile |
|-----|-----|-----|-----|-----|-------|-----------|------------|
| 63.7 | 4.83 | 1.4 | 0.99 | 1.8 | 7.22 | 71.7 | 21.0 |

Calculated Gross Calorific Value = 33,346 kJ/kg

It needs a projected area of about 185 $m^2$ of coked coal melt interface to attain the fixed carbon dissolution rate required to produce 100,000 tonnes per year of titanium dioxide contained in a slag of 90% $TiO_2$ content. Assuming that the second hearth is 7.5 m wide and 35 m in overall length, some 25 m of this length is committed to the maintenance of the virtually static floating layer of coked coal held in place by the downstream underflow weir. With iron-carbon melt flowing underneath this coked coal layer at a velocity of about 20 cm/s, the required fixed carbon dissolution rate can be sustained with an iron-carbon melt circulation rate of about 45 tonne per minute which is about the circulation rate attained by a moderately sized RH steel degassing unit in a commercial practice. On the same basis the size of the first hearth would be about 5 m wide with an overall length of about 30 m.

For the present example it can be shown that the thermal energy requirement per tonne of products (titania slag plus hot metal product) is about 10 GJ/per tonne, whereas it is believed that somewhere in the region of 25 GJ per tonne of products is required for the existing electric furnace technology as practised, for example, at Richards Bay in South Africa, assuming of course that the electricity being used is thermally generated from fossil fuel.

Preferably, the FeO content of the titania enriched slag is not more than 5% by weight and the titania content is not less than about 90% by weight.

Accurate temperature control is also important in preventing excessive over-reduction of $TiO_2$. Temperature control in the process of the present invention is simplified because it is possible to maintain a virtually uniform temperature, or at least minimal temperature variation, throughout the whole of the circuit because of the "heat sink" property of the large mass of circulating molten carrier material.

Carbon monoxide, hydrogen and other coal volatiles produced as a result of carbonisation of the carbonaceous reductant can be burnt in the first hearth whilst carbon monoxide produced as a result of the reduction of iron oxide in the titaniferous material and the partial reduction of $TiO_2$ to $Ti_2O_3$ can be burnt in the second hearth, to form carbon dioxide in both hearths since it is not normally practicable to transport extremely hot gases between the hearths. In a preferred arrangement, accumulation of slag in both hearths is prevented by continuously removing the slag from the hearths in such a manner that the heat of such combustion is transferred effectively to the relatively clean melt surface in the second hearth, but in the first hearth a somewhat thicker layer of slag (typically about 4 mm thick) is formed whereby the titania slag temperature is raised appreciably above that of the underlying metal.

BRIEF DESCRIPTION OF THE DRAWINGS

An embodiment of the present invention will be now be described, by way of example, with reference to the accompanying drawing which is a schematic plan view of equipment for the production of hot metal, ie, Fe (C) and high purity $TiO_2$ slag.

Referring now to the drawing, the plant comprises a first or upper hearth 10, a second or lower hearth 11, a high purity $TiO_2$ slag removal chamber or slag reservoir 12, a carbonaceous reductant feed chamber 14, a coal ash slag removal chamber 16, and a chamber 18.

The upper hearth 10 discharges via an overflow weir 20 into the chamber 12 which is connected with chamber 14 via an underflow weir 22. The chamber 14 discharges into an upstream end of the lower hearth 11 via an overflow weir 24. The downstream end of the lower hearth 11 is connected with chamber 16 via an underflow weir 26. The chamber 16 communicates with the chamber 18 via an R-H unit 28 having an inlet snorkel 30 in the chamber 16 and an outlet snorkel 32 in the chamber 18.

In use, operation of the R-H unit 28 serves to circulate molten carrier material (iron containing dissolved carbon) at a speed of about 5 cm/s in a closed loop extraction circuit serially through chamber 18, upper hearth 10, chamber 12, chamber 14, lower hearth 11 and chamber 16. Dry lump coal (and associated fines) as the carbonaceous reductant is introduced into the chamber 14 via line 34 on top of the molten carrier material before flowing over weir 24 into the upstream end of the lower hearth 11. During passage of the molten carrier material and coal along the lower hearth 11, the coal carbonises to form carbon, carbon monoxide, hydrogen and other coal volatiles. Coal ash slag forms on top of the molten carrier material in the lower hearth 11 as a moving thin layer (typically less than 0.02 mm thick). Such coal ash slag is dammed by the underflow weir 26 at the downstream end of the lower hearth 11 so that it collects as a stationary layer at the downstream end region of the hearth 11. This causes a relatively stationary layer of coked coal to accumulate at the downstream end region of the hearth 11. Meanwhile, the molten carrier material continues to pass under the relatively stationary layer of coked coal and thereby picks up carbon therefrom. The addition of the coal and the temperature are closely controlled so as to ensure that the carbon content of the hot metal forming the molten carrier material is in the range of 3 to 5% by weight.

The molten carrier material containing the dissolved carbon is removed from under the slag in the chamber 16 via the inlet snorkel 30 of the R-H unit 28. Periodically, the removal rate via snorkel 30 is slowed to cause accumulated coal ash slag and associated coke particles and some of the carrier material to overflow the weir 26 and collect in the chamber 16 where the coke particles are gasified by one or more top blow oxygen lances 35. The resultant coal ash slag is removed from chamber 16 via line 36. The $CO/CO_2$ gases generated by the top blowing pass back up the second hearth 11 to be combusted with air via lines 47 above the melt along with the coal volatiles so that the heat thus generated satisfies not only the coal carbonisation and dissolution requirement, but also is picked up by the relatively clean carrier material towards the upstream end of the hearth 11 so that heat is transferred as sensible heat to assist in satisfying the thermal demands of the smelting reduction in the first hearth 10.

The molten carrier material which is now free of the coal ash slag is transported into chamber 18 via the R-H unit 28 and passes from there to the hearth 10 via channel 40. Cold pellets of titaniferous material, eg ilmenite concentrate or titaniferous magnetite, are introduced via feed 38 extending across the hearth 10 gently onto the carrier material after the latter has passed through the channel 40. As described hereinbefore, the pellets of titaniferous material are caused to float on the surface of the carrier material for an extended period whilst being essentially unheated from above, during which time the iron oxide in the titaniferous material reacts with the carbon in the carrier material to form iron and carbon monoxide and some of the $TiO_2$ is reduced to $Ti_2O_3$. The material is then heated from above by combusting the carbon monoxide with preheated air via lines 46 to produce a partially fused layer of titania slag containing $Ti_2O_3$ (about 4 mm thick) on top of the carrier material in hearth 10. This slag 20 together with the molten carrier material overflows via weir 20 into the chamber 12 where the slag is top blown with oxygen via line 41 to convert $Ti_2O_3$ to $TiO_2$ and to release heat which ensures that the slag is in a sufficiently fluid state to release entrained metal prills. Localised cooling is effected in chamber 12 as described previously herein. The resultant high purity titania slag product (typically about 90% titania and 5% FeO) is removed via line 42. The molten carrier material from which the high purity $TiO_2$ slag has been removed then flows via underflow weir 22 into the chamber 14.

Hot metal is bled off from the circuit via line 44 which is located in the chamber 14 immediately adjacent the underflow weir 22, although it may be removed at any convenient location in the circuit.

Instead of being separate therefrom, the chambers 12 and 18 may be formed by regions of the first hearth 10 divided from the remainder of the latter by respective weirs, and likewise for the chambers 14 and 16 in respect of the hearth 11. Thus, the chambers 12 and 18, even though they are shown as separate items, can be considered to constitute downstream and upstream end regions, respectively, of the first hearth 10. Likewise, the chambers 14 and 16 can be considered to constitute upstream and downstream end regions, respectively, of the second hearth 11.

I claim:

1. A method of upgrading titaniferous material; containing iron oxide, comprising the steps of circulating a molten carrier material comprising molten iron and dissolved carbon in a closed loop path through first and second hearths; introducing the titaniferous material into the carrier material; heating the introduced titaniferous material in a heating zone in the first hearth so as to reduce iron oxide to iron and produce a titania slag having a solid rutile phase; removing the titania enriched slag from the molten carrier material before the latter is circulated to the second hearth; introducing carbonaceous reductant into the molten carrier material so as to cause carbon to dissolve in the carrier in the second hearth; and performing a further slag removal operation on the circulating molten carrier material before passing the latter to the first hearth.

2. A method as claimed in claim 1, wherein the amount of dissolved carbon in the molten iron contacted by the titaniferous material exceeds 2% by weight.

3. A method as claimed in claim 1, wherein the amount of dissolved carbon is 3 to 5% by weight.

4. A method as claimed in claim 1, wherein the titania enriched slag contains not more than 5% by weight of Fe and the titanium content is not less than about 90% by weight.

5. A method as claimed in claim 1, wherein the titaniferous material is introduced in the form of pellets onto the surface of the molten iron containing dissolved carbon.

6. A method as claimed in claim 1, wherein the molten iron containing dissolved carbon is maintained at a lower temperature than the titania enriched slag in contact therewith.

7. A method as claimed in claim 1, wherein the titaniferous material is introduced so as to form a layer on the molten iron containing dissolved carbon and is heated from above after a delay upon introduction so as to delay fusion of the titaniferous material.

8. A method as claimed in claim 1 wherein the titaniferous material contains $TiO_2$, a proportion of which is reduced to $Ti_2O_3$ during reduction of the iron oxide to iron so that the titania slag contains a proportion of $Ti_2O_3$, such that slag is passed to a slag reservoir, and the $Ti_2O_3$ is oxidized to $TiO_2$ so that sufficient heat is released in the slag reservoir to fuse any remaining solid rutile phase In the slag before the slag product is removed.

9. A method as claimed in claim 1, wherein the carbonaceous reductant is introduced into the carrier material by establishing a relatively stationary layer of the carbonaceous reductant on the carrier material and causing the carrier material to flow under such layer whereby to pick up carbon from such layer of reductant.

\* \* \* \* \*

UNITED STATES PATENT AND TRADEMARK OFFICE
CERTIFICATE OF CORRECTION

PATENT NO.   : 5,853,452
DATED        : December 29, 1998
INVENTOR(S)  : Noel A. Warner It is certified that error appears in the above-indentified patent and that said Letters Patent is hereby corrected as shown below:

Claim 1, column 8, line 3, after "titania" insert --enriched--.

Signed and Sealed this

Sixth Day of April, 1999

Attest:

Attesting Officer

Q. TODD DICKINSON

Acting Commissioner of Patents and Trademarks